United States Patent [19]
Mihai et al.

[11] Patent Number: 5,927,912
[45] Date of Patent: Jul. 27, 1999

[54] COMPOSITE DRILL BIT USING ADHESIVE BOND

[75] Inventors: Benjamin Mihai, Santa Ana; Gary P. Erpenbeck, Laguna Hills, both of Calif.

[73] Assignee: Tycom Corporation, Irvine, Calif.

[21] Appl. No.: 09/015,048

[22] Filed: Jan. 28, 1998

[51] Int. Cl.$^6$ .............................. B23B 51/02; B32B 1/06
[52] U.S. Cl. ................ 408/226; 76/108.6; 156/294; 427/242
[58] Field of Search ...................... 408/226, 144; 76/108.1, 108.6; 156/294; 427/242

[56] References Cited

U.S. PATENT DOCUMENTS

| | | | |
|---|---|---|---|
| 3,751,176 | 8/1973 | Von Hollen | 408/226 |
| 3,850,054 | 11/1974 | Weissman | 408/226 |
| 5,048,375 | 9/1991 | Kobayashi | 408/226 |
| 5,116,172 | 5/1992 | Koster | 408/226 |
| 5,338,569 | 8/1994 | Hatch | 427/242 |

*Primary Examiner*—Steven C. Bishop
*Attorney, Agent, or Firm*—Stetina Brunda Garred & Brucker

[57] ABSTRACT

A composite drill bit comprising a shank member having a bore disposed therein and an insert which is disposed within the bore such that a portion of the insert protrudes from the shank member. The insert is rigidly secured within the bore of the shank member through the use of an ambient cure adhesive.

11 Claims, 1 Drawing Sheet

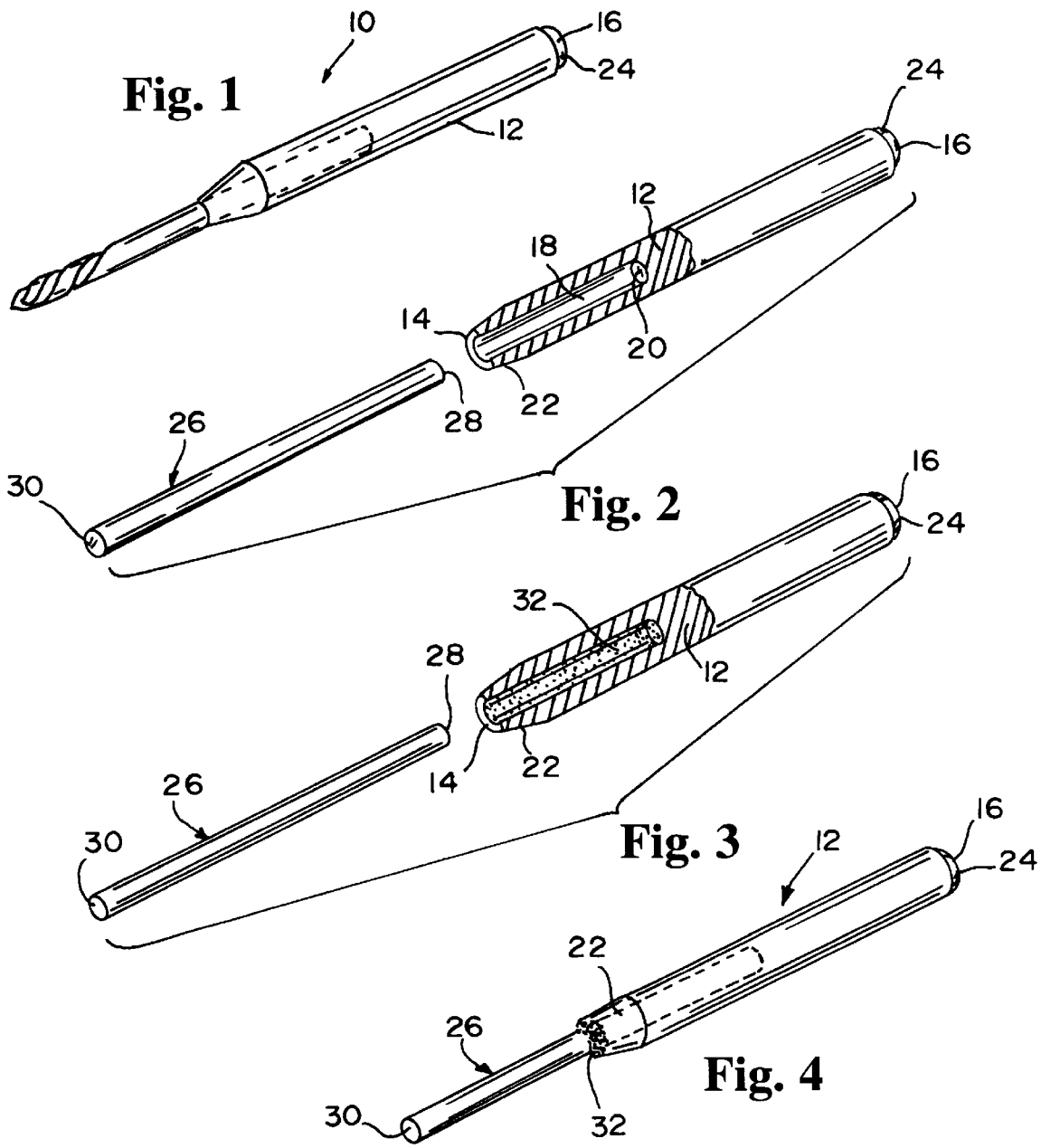

COMPOSITE DRILL BIT USING ADHESIVE BOND

FIELD OF THE INVENTION

The present invention relates generally to cutting tools, and more particularly to a composite drill bit which employs an adhesive to facilitate the rigid attachment of a drill blank to a shank.

BACKGROUND OF THE INVENTION

There is currently known in the prior art drill bits for use in differing applications which comprise a shank having a cutting tool rigidly secured thereto. More particularly, the shank of the prior art drill bits includes a hole extending therein which accommodates a portion of the cutting tool. In the prior art drill bits, two different processes or techniques are typically employed to facilitate the rigid attachment of the cutting tool to the shank. The first prior art process is a brazed slip fit process wherein the cutting tool, subsequent to being inserted into the shank hole, is rigidly attached to the shank itself via a low temperature braze alloy which is used as a bonding filler material in a clearance provided between the cutting tool and the shank. The second process is a heat shrinking or shrink fit process. The heat shrinking process involves fitting a cutting tool of slightly larger outside diameter into the smaller shank hole of the shank. In this respect, heat is applied to the shank at a temperature sufficient to thermally increase the diameter of the shank hole thereof to one which is greater than the diameter of the cutting tool. Subsequent to the thermal expansion of the shank hole, the cutting tool is advanced thereinto. The shank is then allowed to cool, thus resulting in the thermal contraction thereof about the cutting tool, and hence the rigid attachment of the cutting tool to the shank through an interference fit.

Though the above-described processes are generally suitable for facilitating the rigid attachment of the cutting tool to the shank, they possess certain deficiencies which detract from their overall utility. More particularly, in the prior art heat shrinking process, the strength of the shrink fit depends on the values of the coefficients of friction for the two materials and the pressure between the shank and the cutting tool. Shrink or interference fits typically have only a twenty percent (20%) to forty percent (40%) effective contact area due to surface irregularities of the parts in contact. The pressure between the parts is a function of actual interference therebetween, and will vary due to part tolerances and the reduced contact area. Additionally, shrink or interference fits are based on residual stresses in the components which can lead to premature fatigue failure of the assembly. Because the effective contact area between the parts is relatively low when the heat shrinking process is employed, the assembly is highly susceptible to failure during a cutting operation which results in the pull-out of the cutting tool from within the shank.

The prior art brazed slip fit process is itself undesirable due to such process sometimes giving rise to occurrences of radial distortion of the cutting tool relative to the shank. This process also results in the annealing of the shank which softens the same and thus increases its susceptibility to failure. Moreover, the prior art brazed slip fit process is both time consuming and labor intensive, and thus costly. The present invention overcomes the deficiencies of these prior art processes by providing a method of assembling a composite drill bit wherein an insert, such as a drill blank, is rigidly attached to a shank member through the use of an ambient cure high strength, high temperature adhesive.

SUMMARY OF THE INVENTION

In accordance with the present invention, there is provided a composite drill bit comprising a generally cylindrical shank member having opposed ends and a bore extending axially within one end thereof. The bore has a generally circular cross-sectional configuration and defines a closed bottom end. The shank member is preferably fabricated from stainless steel, and defines a tapered portion which extends to the end thereof having the bore disposed therein.

In addition to the shank member, the composite drill bit includes a generally cylindrical insert which has opposed ends and is disposed within the bore such that one end of the insert resides therewithin and a portion of the insert protrudes from the shank member. In the present composite drill bit, the insert is rigidly secured within the bore of the shank member through the use of an adhesive. The insert itself preferably comprises a drill blank which has a diameter in the range of approximately 0.010 to 0.050 inches and is fabricated from carbide or tungsten carbide cobalt. The preferred adhesive is an ambient cure adhesive comprising a structural acrylic with an acetone base mixture serving as a primer. To maximize the strength of the adhesive bond between the shank member and the insert, the bore of the shank member is preferably sized relative to the insert so as to define a nominal diametrical clearance between the shank member and the insert of approximately 0.0011 inches. Additionally, the end of the insert residing within the bore is preferably spaced from the closed bottom end thereof by a distance of approximately 0.020 inches.

Further in accordance with the present invention, there is provided a method of assembling a composite drill bit which comprises the initial step of providing a shank member having a bore disposed therein which includes a closed bottom end. The method further comprises the step of adhesively securing an insert having opposed ends within the bore such that one end of the insert resides within the bore and a portion of the insert protrudes from the shank member. The adhesive is then allowed to cure at ambient temperature.

The securing step of the present method is preferably accomplished by initially coating at least a portion of those inner surfaces of the shank member defining the bore with a primer, and then injecting a quantity of an adhesive into the bore. Thereafter, a portion of the insert is inserted into the bore and axially advanced therein to a point whereat the end of the insert residing within the bore is spaced from the closed bottom end thereof by a distance of approximately 0.020 inches. Though not preferred, the rigid attachment of the insert to the shank member may alternatively be accomplished by only applying the adhesive to a portion of the insert and subsequently inserting the coated portion thereof into the bore, or by applying the adhesive to the insert and injecting the adhesive into the bore prior to advancing the coated portion of the insert into the bore. Subsequent to the insert being adhesively secured to the shank member, the exposed portion of the insert (i.e., that portion thereof protruding from the shank member) and a portion of the shank member are preferably machined as part of a finishing operation in a manner forming flutes on the insert.

BRIEF DESCRIPTION OF THE DRAWINGS

These, as well as other features of the present invention, will become more apparent upon reference to the drawings wherein:

FIG. 1 is a perspective view of a composite drill bit constructed in accordance with the present invention;

FIG. 2 is an exploded view of the present composite drill bit illustrating the shank member and insert thereof, and the adhesive coating applied to a portion of the insert;

FIG. 3 is an exploded view of the present composite drill bit similar to FIG. 2 and further illustrating the injection of the adhesive into the bore of the shank member; and FIG. 4 is a perspective view of the present composite drill bit subsequent to the insert being adhesively secured to the shank member but prior to the insert and shank member being machined through a subsequent finishing operation.

DETAILED DESCRIPTION OF THE PREFERRED EMBODIMENT

Referring now to the drawings wherein the showings are for purposes of illustrating a preferred embodiment of the present invention only, and not for purposes of limiting the same, FIG. 1 perspectively illustrates a composite drill bit 10 constructed in accordance with the present invention. As best seen in FIGS. 2 and 3, the drill bit 10 comprises an elongate, generally cylindrical shank member 12 which defines a first end 14 and a second end 16. Disposed within the first end 14 is an elongate bore 18 which has a generally circular cross-sectional configuration. The bore 18 extends axially within the shank member 12, and defines a closed bottom end 20. The shank member 12 further includes a tapered portion 22 which extends inwardly toward the first end 14 and thus defines a transition between the first end 14 and the remainder of the shank member 12. Similarly, the transition between the second end 16 and the remainder of the shank member 12 is defined by a beveled portion 24 thereof. In the preferred embodiment, the shank member 12 is fabricated from stainless steel, though other materials may be employed in relation thereto.

In addition to the shank member 12, the drill bit 10 of the present invention includes an elongate, generally cylindrical insert 26 which itself defines a first end 28 and a second end 30. In the drill bit 10, the insert 26 preferably comprises a drill blank which has a diameter in the range of approximately 0.010 to 0.050 inches and is fabricated from carbide or tungsten cobalt. However, those of ordinary skill in the art will recognize that the insert 26 may be provided with a diameter which is outside the aforementioned range or is fabricated from a material other than for carbide or tungsten carbide cobalt.

In the present drill bit 10, the insert 26 is rigidly attached to the shank member 12 (i.e., rigidly secured within the bore 18) through the use of an adhesive 32. The preferred adhesive 32 is an ambient cure adhesive comprising a structural acrylic with an acetone base mixture serving as a primer. One such preferred adhesive is commercially available as Hernon React 727 from Hernon Manufacturing, Inc. of Sanford, Fla.

Referring now to FIGS. 2–4, the assembly of the drill bit 10 (i.e., the rigid attachment of the insert 26 to the shank member 12 through the use of the adhesive 32) is preferably accomplished by initially applying a coating of a primer to those inner surfaces of the shank member 12 defining the bore 18 thereof. As such, the primer is applied to the closed bottom end 20 of the bore 18, as well as the cylindrically configured inner surface of the shank member 12 defining the remainder of the bore 18. Such coating is preferably accomplished through the use of a tumbling process, with excess primer being blotted away and the shank member 12 being allowed to "dry" for no more than 24 hours. After the bore 18 has been coated with the primer, the adhesive 32 is injected into the interior of the bore 18 in a quantity sufficient to coat the bottom end 20 as well as the inner surface of the shank member 12 defining the remainder of the bore 18. Thereafter, approximately half of the length of the insert 26 to and including the first end 28 thereof is inserted into the bore 18, thus resulting in the first end 28 of the insert 26 residing within the bore 18 and approximately half of the length of the insert 26 (including the second end 30) protruding from the shank member 12. Upon the insertion of the insert 26 into the adhesive filled bore 18, the cure of the adhesive 32 is almost immediate. The injection of the adhesive 32 into the bore 18 and the insertion of the insert 26 thereinto are preferably accomplished through the use of an automatic machine.

As will be recognized, the diameter of the bore 18 must necessarily exceed the outer diameter of the insert 26 to allow the insert 26 to be advanced into the bore 18. To maximize the strength of the adhesive bond between the shank member 12 and the insert 26, the bore 18 and the insert 26 are preferably sized relative to each other such that a nominal diametrical clearance of approximately 0.0011 inches is defined between the shank member 12 and the insert 26. Additionally, the insert 26 is preferably not advanced into the bore 18 such that the first end 28 thereof bottoms out against the bottom end 20. Rather, the insert 26 is preferably axially advanced into the bore 18 to a depth whereat the first end 28 is spaced from the bottom end 20 by a distance of approximately 0.020 inches. As will be recognized, such spacing allows the adhesive 32 to form a direct bond between the first end 28 of the insert 26 and the bottom end 20 of the bore 18. In the preferred embodiment, the shank member 12 and insert 26 are fixtured to provide the resultant assembly with an overall length of approximately 1.505+/−0.001 inches. the spacing between the first end 28 and the bottom end 20 often occurs as a result of holding the overall length of the assembly in the aforementioned range.

As seen in FIG. 4, the axial advancement of the insert 26 into the bore 18 in the above-described manner typically results in excess adhesive 32 being forced from between the insert 26 and shank member 12. Such excess adhesive 32 normally accumulates on the first end 14 of the shank member 12 about the insert 26. After the insert 26 has been axially advanced into the bore 18, the adhesive 32 is simply allowed to cure. Since the adhesive 32 is an ambient cure adhesive, the attached shank member 12 and insert 26 need not be subjected to any special cooling or heating procedures.

Referring now to FIG. 1, subsequent to the insert 26 being adhesively secured (i.e., rigidly attached) to the shank member 12 in the above-described manner, various finishing operations are preferably performed thereon to form the drill bit 10. Such finishing operations include grinding the outer surface of the shank member 12 to provide the same with a smooth, uniform outer diameter, grinding the tapered portion 22 of the shank member 12 and a section thereof adjacent the tapered portion 22 to define a neck between the shank member 12 and insert 26, and fluting the exposed portion of the insert 26. The shank member 12 and/or insert 26 may also be subjected to other grinding procedures.

As described above, in the drill bit 10, the adhesive 32 is preferably injected into the primer coated bore 18 for purposes of rigidly attaching the insert 26 to the shank member 12. Though not preferred, such rigid attachment may alternatively be accomplished by applying the adhesive 32 to only a portion of the insert 26 and subsequently inserting the coated portion thereof into the bore 18, or by applying the adhesive 32 to the insert 26 and injecting the adhesive 32 into the bore 18 prior to advancing the coated portion of the insert 26 into the bore 18.

Advantageously, the use of the adhesive 32 in the present drill bit 10 for purposes of rigidly attaching the insert 26 to the shank member 12 substantially reduces the cost associated with the manufacture of the drill bit 10 as compared to those prior art drill bits assembled through the use of a brazed slip fit process. Additionally, the use of the adhesive 32 prevents occurrences of radial distortion and/or material softening as often results during the assembly of prior art drill bits through the use of the brazed slip fit process. Moreover, the adhesive bond created by the adhesive 32 is strong enough to withstand well in excess of the forces to which the drill bit 10 would normally be subjected, and thus prevents any pull-out of the insert 26 from within the shank member 12 during use of the drill bit 10. In this respect, such adhesive bond is substantially stronger than the nominal interference provided between the shank and cutting tool when the prior art heat shrinking process is employed. As such, the major shortcomings of the prior art heat shrinking process (a nominal 25% interference between the two parts) and the brazed slip fit process (approximately 50% better engagement between the parts as compared to a shrink fit but with radial distortion) are overcome by the present invention wherein the adhesive 32 provides a 100% bond of extreme strength with no distortion.

Additional modifications and improvements of the present invention may also be apparent to those of ordinary skill in the art. Thus, the particular combination of parts described and illustrated herein is intended to represent only one embodiment of the present invention and is not intended to serve as limitations of alternative devices within the spirit and scope of the invention.

What is claimed is:

1. A composite drill bit comprising:
   a generally cylindrical shank member having opposed ends and a bore extending axially within one end thereof, said bore having a generally circular cross-sectional configuration and defining a sidewall and a closed bottom end; and
   a generally cylindrical insert having opposed first and second ends, said insert being partially inserted into the shank member in a manner wherein the first end of the insert resides within the bore and is spaced from the bottom end thereof by a distance of at least about 0.020 inches and a portion of the insert which includes the second end thereof protrudes from the shank member, the bore and the insert being sized relative to each other such that a nominal diametrical clearance of at least about 0.0011 inches is defined between the sidewall of the bore and the insert;
   said insert being rigidly secured within the bore of the shank member through the use of an adhesive which forms an adhesive bond between the first end of the insert and the bottom end of the bore and between the sidewall of the bore and the insert.

2. The composite drill bit of claim 1 wherein the insert has a diameter in the range of approximately 0.010 to 0.050 inches.

3. The composite drill bit of claim 1 wherein the shank member defines a tapered portion which extends to the end thereof having the bore disposed therein.

4. A method of assembling a composite drill bit, comprising the step of:
   (a) providing a shank member having a bore disposed therein which includes a sidewall and a closed bottom end;
   (b) applying a primer to the sidewall and the bottom end of the bore;
   (c) injecting an adhesive into the bore; and
   (d) partially inserting an insert having opposed first and second ends into the bore in a manner wherein the first end of the insert resides within the bore and a portion of the insert which includes the second end thereof protrudes from the shank member.

5. The method of claim 4 wherein step (d) comprises inserting the insert into the bore such that the first end of the insert residing within the bore is spaced from the closed bottom end thereof by a distance of approximately 0.020 inches.

6. The method of claim 4 wherein step (a) comprises inserting the insert into the bore such that the composite drill bit has an overall length of approximately 1.505+/31 0.001 inches.

7. The method of claim 4 wherein step (b) comprises:
   (i) tumbling the shank member in a chamber having the primer included therein;
   (ii) blotting excess primer from the shank member; and
   (iii) allowing the primer to dry.

8. The method of claim 7 wherein step (iii) comprises allowing the primer to dry for a time period of not more than 24 hours.

9. The method of claim 4 further comprising the step of:
   (e) machining that portion of the insert protruding from the shank member to form flutes thereon.

10. A method of assembling a composite drill bit, comprising the steps of:
    (a) providing a shank member having a bore disposed therein which includes a sidewall and a closed bottom end;
    (b) injecting an adhesive into the bore; and
    (c) partially inserting an insert having opposed first and second ends into the shank member in a manner wherein the first end of the insert resides within the bore and is spaced from the closed bottom end thereof by a distance of at least about 0.020 inches and a portion of the insert which includes the second end thereof protrudes from the shank member.

11. The method of claim 10 wherein step (b) comprises applying a primer to the sidewall and the bottom end of the bore prior to the injection of the adhesive thereinto.

* * * * *